United States Patent [19]
Wolrich et al.

[11] Patent Number: 6,018,756
[45] Date of Patent: Jan. 25, 2000

[54] REDUCED-LATENCY FLOATING-POINT PIPELINE USING NORMALIZATION SHIFTS OF BOTH OPERANDS

[75] Inventors: Gilbert M. Wolrich, Framingham; Mark D. Matson, Acton; John D. Clouser, Pepperell, all of Mass.

[73] Assignee: Digital Equipment Corporation, Maynard, Mass.

[21] Appl. No.: 09/041,905

[22] Filed: Mar. 13, 1998

[51] Int. Cl.[7] .................................................. G06F 7/00
[52] U.S. Cl. ...................... 708/505; 708/508; 708/205; 340/146.2; 712/222
[58] Field of Search .................................. 708/505, 508, 708/205; 340/146.2; 712/222

[56] References Cited

U.S. PATENT DOCUMENTS

| | | | |
|---|---|---|---|
| 4,922,446 | 5/1990 | Zurawski et al. | 708/505 |
| 5,010,508 | 4/1991 | Sit et al. | 708/505 |
| 5,027,308 | 6/1991 | Sit et al. | 708/505 |
| 5,627,773 | 5/1997 | Wolrich et al. | 708/204 |
| 5,684,729 | 11/1997 | Yamada et al. | 708/505 |
| 5,884,062 | 3/1999 | Wichman et al. | 712/218 |
| 5,901,076 | 5/1999 | Lynch | 708/505 |

*Primary Examiner*—Meng-Ai T. An
*Assistant Examiner*—Gautam R. Patel
*Attorney, Agent, or Firm*—Cesari and McKenna, LLP

[57] ABSTRACT

If the exponents of a floating-point-processor addition pipeline's input operands are equal, a signal (INVERT) that determines whether the pipeline's sole full-width carry-propagate mantissa adder (34) will invert one of its inputs results from an inversion-determination circuit (FIG. 11) that determines whether the sole set bit in a decoded normalization-shift signal (NORM_SHIFT) occupies the same position as a set bit in a signal (FRAC_A_GT_B) representing what the possible normalization amounts will be if a first of the mantissas is greater than the other, second mantissa. Consequently, a bit-comparison operation (56) that employs no full-width carry-propagate addition can determine the amount of normalization shifting to be performed by bit shifters (30 and 32) disposed in respective processing trains that generate mantissa inputs to the mantissa adder (34).

8 Claims, 11 Drawing Sheets

REDUCED-LATENCY FLOATING-POINT PIPELINE USING NORMALIZATION SHIFTS OF BOTH OPERANDS

BACKGROUND OF THE INVENTION

The present invention is directed to floating-point processors and in particular to the addition/subtraction pipelines that they employ.

Computers often use floating-point representations to represent some numbers. And many microprocessors include separate circuitry for performing operations on floating-point numbers. Such circuits take many forms, but the one that FIG. 1 depicts is typical. The floating-point processor 10 depicted there includes a control circuit 11 to which are directed microprocessor operation codes that request floating-point operations. That circuit in turn directs the operation codes that request multiplications, divisions, and additions/subtractions to respective modules sections 12, 13, and 14 that respectively specialize in those operations. Those modules in turn draw their operands from registers 15, in which the modules also store their results.

The invention to be described below concerns the addition/subtraction module 14. As is suggested by the drawing's linkage between the division and addition/subtraction modules, the addition/subtraction module may actually be involved in other operations, too, such as assisting in division, converting from fixed-point to floating-point format, or converting between floating-point formats. But for the sake of simplicity the discussion that follows concentrates only on addition and subtraction of single-format floating-point operands and omits any discussion of provisions peculiar to other operations.

Floating-point representations typically have the format <sign, exponent, mantissa >. One of the operations that an addition/subtraction module must perform is mantissa alignment. Suppose, for example, that operand A is $0.111100 \times 2^{12}$ and operand B is $0.101000 \times 2^9$. To add those operands' mantissas properly, operand B must be re-expressed as $0.000101 \times 2^{12}$; i.e., its mantissa must be shifted by a number of bit positions equal to the original exponent difference. In that example, the smaller operand's mantissa is shifted by only three bit positions, but an alignment step can involve as much as a fifty-four-position shift in a typical sixty-four-bit machine. Shifts of that size tend to be relatively time-consuming.

For this and other reasons, the addition/subtraction module's process flow may be "pipelined," as FIG. 2 illustrates: the actual addition of one set of operands' (aligned) mantissas may be performed in a third stage 16 concurrently with the alignment in a second stage 17 of the next set to be added—and both may be performed concurrently with an operation in a first stage 18 that determines the amount of shifting required in the set after that. So the addition/subtraction module is often called an addition pipeline, or "add pipe." FIG. 2 depicts the add pipe as comprising three stages, but some add pipes have more or fewer stages.

Now, a floating-point processor's output should be normalized, i.e., so expressed that its mantissa's value is always, say, at least one-half but less than one: the first one bit must occur immediately to the right of the binary point. (This is the VAX floating-point format. In IEEE floating-point formats, the mantissa's value should always be at least one but less than two: the first one bit must occur immediately to the left of the binary point. But the discussion that follows will be based on the assumption that the add pipe employs the VAX format.) So in addition to the just-described alignment shift, floating-point add pipes also need to perform another, normalization shift. In the previous example, for instance, the raw result of the third stage's mantissa addition in is 1.000001, which does not meet the normalization criterion, so the result must be re-expressed as 0.100000 (or 0.100001 after rounding): the mantissa needs to be shifted.

Differences between the amounts of shifting respectively required for normalization and alignment make it necessary to treat effective subtractions (i.e., subtractions of operands whose signs are the same and additions of operands whose signs differ) of similar-magnitude operands differently from other effective subtractions and from effective additions (i.e., additions of operands whose signs are the same and subtractions of operands whose signs differ).

The amount of this normalization shifting is at most one bit position both for effective additions and, if the operands' exponent difference is at least two, for effective subtractions. A one-position shift takes much less time than the potentially fifty-four-position shift that alignment can require, so the single-position shift can be performed in the same (in the example, third) stage as the mantissas' addition or subtraction—unless the operation is an effective subtraction of operands whose exponent difference is zero or one.

For such low-exponent-difference effective subtractions, though, the normalization shifts can take as many bit positions (but in the opposite direction) as alignment shifts can in other operations. If $0.111100 \times 2^{12}$ is subtracted from $0.111101 \times 2^{12}$, for example, the result is $0.000001 \times 2^{12}$, which must be normalized to $0.100000 \times 2^7$; i.e. the mantissa must be shifted by five bit positions. So it is not attractive in such operations to do all of the normalization in the same stage as the subtraction. On the other hand, alignment for such operations never requires more than a one-bit-position shift, so a whole stage need not be set aside for it, as it must for other operations. So in low-exponent-difference effective subtractions some add pipes use for normalization the multiple-position-shift circuitry otherwise employed for alignment.

One conventional way to do this involves the arrangement of FIG. 2's first stage 18 that FIG. 3 depicts. The first stage 18 includes circuitry 19 for performing a speculative subtraction of the operands' mantissas in parallel with the exponent subtraction 20, mentioned above, that determines what the alignment-shift amount will be if the operation turns out not to be a low-exponent-difference effective subtraction. The circuit-19 subtraction is "speculative" because it is performed at a point in the operation at which the proper alignment is not yet known; circuitry 20 has not yet completed its determination. The subtraction is based on the assumption that the exponent difference is zero or one and that the requested operation is an effective subtraction.

If this assumption turns out to be erroneous, then the speculative-subtraction output is discarded, and the second stage merely performs an alignment shift on the smaller operand's mantissa to prepare it for mantissa subtraction in the third stage. But if the assumption proves correct, then the mantissa subtraction will already be complete when the operation proceeds to the second stage. Rather than alignment, therefore, that stage can perform potentially multiple-position normalization shifting.

Although the output of the speculative-subtraction circuitry 19 is used only in cases in which the exponent difference is zero or one, this still leaves three possible alignments among which the speculative-subtraction must choose: (1) the mantissas should be subtracted without shifting, (2) they should be subtracted after operand A is shifted to the right by one position, or (3) they should be subtracted after operand B is shifted to the right by one position. But this choice can be made well before circuit 20's exponent subtraction is complete; by comparing only each exponent's two least-significant bits with those of the other, an alignment predictor 22 can determine what the proper alignment will be if the exponent difference does turn out to be zero or one. The speculative subtraction can therefore proceed in parallel with circuit 20's exponent subtraction.

An output of zero or one from the exponent-difference circuit 20 during an effective-subtraction operation means that the multiple-position shifter should act as a normalization shifter rather than an alignment shifter; instead of being determined by circuit 20's exponent-difference output, the shift amount should be determined by the number of leading zeroes in the result of subtracting the smaller aligned mantissa from the larger. (It may be helpful to emphasize at this point that sign and mantissa fields in a typical machine's floating-point format do not together form a two's-complement representation of a number. That is, the four-bit fixed-point binary representations of +1 and −1 are 0001 and 1111, respectively, where the first bit can be thought of as a sign bit, but in a floating-point representation the three mantissa bits are 100 for both numbers: they differ only in their sign bits. This means that the mantissa in the add pipe's output should be the result of subtracting the smaller mantissa from the larger one, regardless of the overall subtraction's direction. In some of the add pipe's intermediate results, though, two's-complement representations do occur, as will shortly be seen.)

One could determine the requisite shift amount by counting the number of leading zeroes in the speculative-subtraction output. (Actually, it would sometimes be necessary to count the number of leading ones instead. When the exponent difference is zero, it will not initially be known which mantissa is larger—neither mantissa will have been shifted by one place to put a zero in it most-significant bit position—so the speculative-subtraction result can be the two's-complement representation of a negative number. This means that it is the number of leading ones that is the indicator of the requisite normalization shift.) However, waiting for the speculative subtraction to be completed before beginning to determine how many leading zeroes or ones the result has would add too much delay for a high-performance processor. To avoid this delay, the add pipe includes a shift-point detector 23, which in parallel with the speculative-subtraction operation performs a known type of operand-mantissa inspection that predicts the required normalization shift so that it is available as soon as the speculative subtraction is complete.

Detector 23's operation involves bit-by-bit comparisons that depend on proper mantissa alignment. Since the proper alignment is not initially known, detector 23 performs those comparisons simultaneously for the three alignments that correspond to exponent differences of zero and one. The alignment predictor 22's output determines which of shift-point detector 23's three results a multiplexor 24 forwards as its indication of the required normalization shift.

As will be explained in more detail below, that indication takes the form of a vector in which each bit indicates whether the corresponding mantissa-difference bit position has the potential to be the shift point, i.e., to be the location of the mantissa difference's most-significant logical one (or, as will be explained below, the bit position next to it). The criteria that detector 23 uses can also be met by locations less significant than the true shift point: its output vector can include more than a single one bit. So a bit stripper 25 removes all of that vector's one bits except the most significant one.

In low-exponent-difference effective subtraction, the second stage's multiple-position shifter uses the resultant vector as a decoded indication of the number of bit positions by which it should shift the speculative difference's mantissa, and the third stage's addition circuit does not need to perform the mantissa subtraction, since the speculative-subtraction circuit 19 has already done it. But the add pipe's output mantissa must be a positive value, whereas the speculative subtraction's result may be negative; if the input operands' exponents are equal, the larger mantissa has not been identified before the speculative subtraction begins, so it is not known which mantissa to subtract from which in order to obtain a positive number. The third stage's addition circuit can therefore be used to subtract the now-normalized speculative-subtraction result from zero if necessary is to convert it to a positive value.

The just-described division of labor among stages contributes significantly to the speed that a high-performance floating-point processor can afford.

SUMMARY OF THE INVENTION

But we have recognized that further speed advantages can be realized by performing the multiple-position normalization shifting before mantissa subtraction, i.e., by performing it on the operands' mantissas rather than on that of the result. Pre-subtraction normalization is not itself new; U.S. Pat. No. 5,010,508 to Sit et al. gives an example of its use. But we have recognized that doing so with a judicious choice of methods for predicting the normalization-shifting amount can reduce the time required to prepare for multiple-position shifting.

Our choice of prediction methods affects what happens when exponents are equal and the subtraction direction required to yield a positive difference therefore is not initially known. For that case, the approach that Sit et al. uses is arbitrarily to select one of the mantissas, subtract it from the other, and, before counting the number of leading zeroes in the difference, invert it if it is negative. When exponents are the same, in other words, the "prediction" operation requires a full carry-propagation addition, just as FIG. 3's approach does. The need for such a full carry-propagation addition increases total latency.

In contrast, we employ a prediction method such as the one that U.S. Pat. No. 5,627,773 to Wolrich et al. describes in connection with its FIG. 5. As will be explained below, this enables us to avoid the need to generate an explicit indication of relative aligned-mantissa sizes before multiple-position normalization shifting begins. We can therefore dispense with the time-consuming full carry-propagation subtraction that prior-art systems employ before their multiple-position shifting.

BRIEF DESCRIPTION OF THE DRAWINGS

The invention description below refers to the accompanying drawings, of which.

DETAILED DESCRIPTION OF AN ILLUSTRATIVE EMBODIMENT

Figure 4:
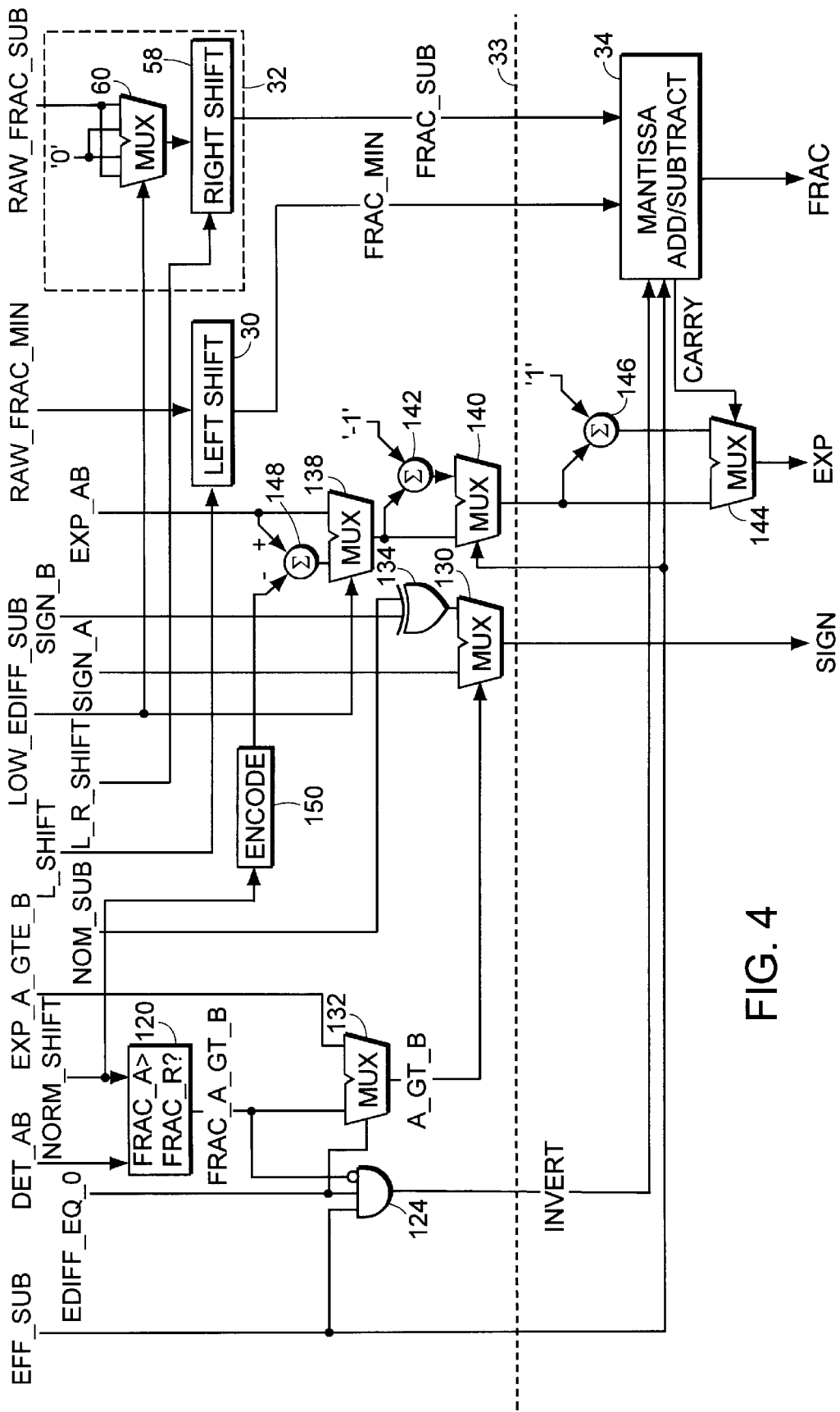
FIG. 4 is a block diagram of the second and third stages of an add pipe that employs the present invention's teachings.

FIG. 4 illustrates the second and third stages of the illustrated embodiment's add pipe. They differ from corresponding stages of similar conventional add pipes in that they are intended to perform multiple-position normalization before any subtraction occurs: the second stage performs the multiple-position normalization shifting on both operands' mantissas before subtraction. This contrasts with arrangements that perform the multiple-position normalization on the single mantissa that results from a first stage's speculative subtraction.

FIG. 4's illustrated second stage accordingly includes not one but two simultaneously operable multiple-position shifters 30 and 32. Like the multiple-position shifter in previous arrangements, shifter 32 is operable to perform both left shifts (for normalization during effective subtraction of similar-magnitude quantities) and right shifts (for alignment during other operations). In contrast, shifter 30 performs only left shifts, since it is used only for normalization.

Shifters 30 and 32 respectively receive minuend and subtrahend mantissas RAW_FRAC_MIN and RAW_FRAC_SUB, which the add pipe's first stage derives from the input-operand mantissas in a manner that will be described presently in connection with FIG. 5. Decoded shift-position vectors (that is, vectors that are all zeros except for at most a single one) L_SHIFT and L_R_SHIFT respectively specify the number of positions by which shifters 30 and 32 shift their inputs. The resultant, shifted mantissas are clocked into latches, not shown but represented by dashed line 33, whose outputs are the third-stage inputs. The add pipe's sole full-width carry-propagate adder 34 adds or subtracts those inputs in accordance with the value of a signal EFF_SUB that the add pipe's first stage has generated to indicate whether the overall operation is an effective-subtraction operation.

Figure 5:
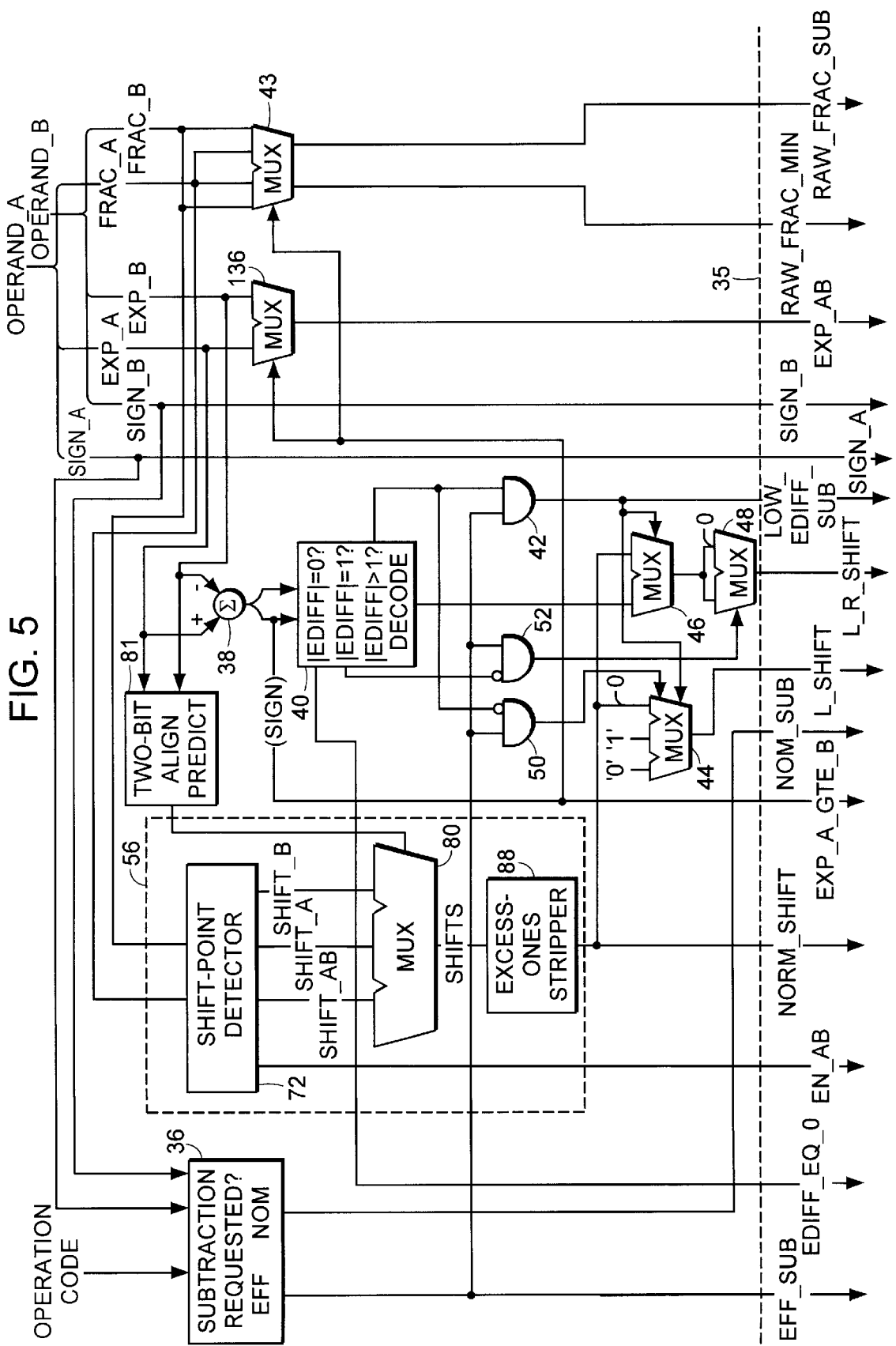
FIG. 5 is a block diagram of such an add pipe's first stage.

To explain the manner in which the first stage generates that signal as well as other inputs to the second stage, we turn to FIG. 5. We assume two input operands OPERAND_A and OPERAND_B clocked into the first stage upon a clock signal. At the same time, the first stage's responses to previous operands are clocked into latches, not shown but represented by dashed line 35, whose outputs are the second stage's inputs. An effective-subtraction-identifying circuit 36 receives those operands' respective sign bits SIGN_A and SIGN_B as well as the operation code that specifies the type of operation the add pipe has been requested to perform. For requested subtractions, circuit 36 asserts EFF_SUB if the sign bits are the same. For requested additions, it asserts EFF_SUB if the sign bits differ.

(Those skilled in the art will recognize that the choice of operation in most add pipes is not merely between addition and subtraction. Also, operation codes typically contain considerably more detail, such as a specification of the floating-point format and the registers from which operands are to be fetched and to which the results are to be stored. But the present invention can be understood more readily without discussing that additional complexity.)

As was explained above, the nature of many of an add pipe's functions depends to a great extent on whether the overall operation is a low-exponent-difference effective subtraction. To determine whether it is, an exponent subtracter 38 compares the operands' exponents EXP_A and EXP_B and applies the result to a circuit 40 that determines whether the magnitude of their difference exceeds one. If not, then an AND gate 42 asserts LOW_EDIFF_SUB during effective subtractions to indicate that the operation is a low-exponent-difference effective subtraction.

If LOW_EDIFF_SUB is not asserted, FIG. 4's multiple-position shifters 30 and 32 should perform alignment shifting. Conventionally, this would mean no shift in the larger operand's mantissa. FIG. 5's multiplexor 43, which receives as inputs the operand's mantissas FRAC_A and FRAC_B, steers the higher-exponent operand's mantissa to shifter 30 as RAW_FRAC_MIN and steers the lower-exponent operand's mantissa to shifter 32 as RAW_FRAC_SUB in response to the exponent difference's sign. This would suggest that left-only shifter 30 should not shift its input, so FIG. 5's multiplexor 44, which generates shifter 30's shift-control vector L_SHIFT, should select its fixed zero-shift-indicating input. The alignment would be achieved by having the left/right shifter 32 shift right by the exponent difference. This would mean that FIG. 5's multiplexors 46 and 48, should forward as shifter 32's shift-control vector L_R_SHIFT the decoded exponent-difference magnitude, which circuit 40 generates as one of its outputs. And, indeed, this is precisely what those multiplexors do when the illustrated circuit performs an effective addition.

During the illustrated embodiment's larger-exponent-difference effective subtractions, though, the asserted output of a further AND gate 50 causes multiplexor 44 to forward a fixed "1"-valued vector as shifter 30's shift-control vector L_SHIFT. This vector's sole one bit is in the position that calls for the larger operand's mantissa to be shifted leftward by a single bit position. And the smaller operand's mantissa is "left shifted" by an additional bit, too, in such operations. Specifically, the assertion of yet another AND gate 52's output, indicating a non-unity-exponent-difference effective subtraction, causes multiplexor 48 to forward the result of right-shifting the decoded exponent difference by one bit position—and thereby decrementing the decoded value by one—instead of forwarding the decoded exponent difference itself. So the smaller operand's mantissa is right shifted by one less position that it would be otherwise.

In short, the bit positions of a given pair of mantissas to be subtracted are one bit to the left of those mantissas' bit positions when they are to be added. We discuss the reason for effective subtractions' extra one-bit leftward shift below in connection with FIG. 12.

Having described the manner in which we develop the multiple-position shifters' shift vectors L_SHIFT and L_R_SHIFT when those shifters are to perform alignment—i.e., when the LOW_EDIFF_SUB signal is not asserted—we now turn to the way in which we develop them when the the multiple-position shifters are to perform normalization. For normalization, the asserted LOW_EDIFF_SUB signal causes FIG. 5's multiplexors 44 and 46 to develop those signals from a (decoded) NORM_SHIFT shift vector, which a normalization-shift-prediction circuit 56 generates, as will be explained below, by comparing corresponding bits of the input-operand mantissas FRAC_A and FRAC_B to predict the position of the most-significant one bit in their difference.

Since the operation being performed is necessarily an effective subtraction—multiple-position normalization occurs only during effective subtractions—the NORM_SHIFT input to the L_SHIFT multiplexor 44's right input port is wired with a one-bit leftward offset to cause our effective-subtraction pre-shift of the larger operand's mantissa. FIG. 5 depicts this offset as a right-side concatenation of a zero bit. For the smaller-operand-mantissa shift-control signal L_R_SHIFT, the leftward pre-shift is provided by multiplexor 48's selection of a similarly offset input if the exponent-difference magnitude is zero.

If the exponent-difference magnitude is one, on the other hand, multiplexor 48 forwards NORM_SHIFT unshifted, thus specifying the required normalization shift without the effective-subtraction pre-shift. The reason for this is that the mantissas need to be aligned when the exponent difference equals one, but FIG. 4's multiple-position shifters would not otherwise align them during low-exponent-difference effective subtractions. So multiplexor 46 in effect adds the one-bit rightward alignment to the one-bit leftward pre-shift, and the two shifts cancel, leaving only the normalization shift.

Actually, FIG. 4's left/right shifter 32 is implemented in a shifter 58 capable of right shifts only, not the left shifts required for normalization. But the add pipe achieves the same result by in effect performing a sixty-four-position leftward shift on the mantissa before applying it to the right shifter 58, which is an extra sixty-four bits wide to accommodate this leftward shifting, and then having shifter 58 shift its resultant contents right by sixty-four minus the desired number of leftward bit shifts.

Specifically, a multiplexor 60 from which shifter 58 receives its mantissa concatenates sixty-four zeroes with the sixty-four bits of the signal that carries the lower-exponent operand's (at most fifty-four-bit) mantissa. If LOW_EDIFF_SUB is de-asserted and thereby signals an alignment shift rather than a normalization shift, multiplexor 60 places these zeroes to the mantissa's right, thereby effectively shifting it sixty-four bits to the left. (The shifter's output is its rightmost sixty-six bits, including a round bit and guard bit to the right of the least-significant input bit.) Then, to specify a rightward shift of sixty-four minus the desired number of leftward shifts, the bits of the NORM_SHIFT vector are applied to multiplexor 46 in the order opposite that in which they are applied to multiplexor 44, so multiplexor 46's right input actually represents sixty-four minus the NORM_SHIFT value.

Figure 6:
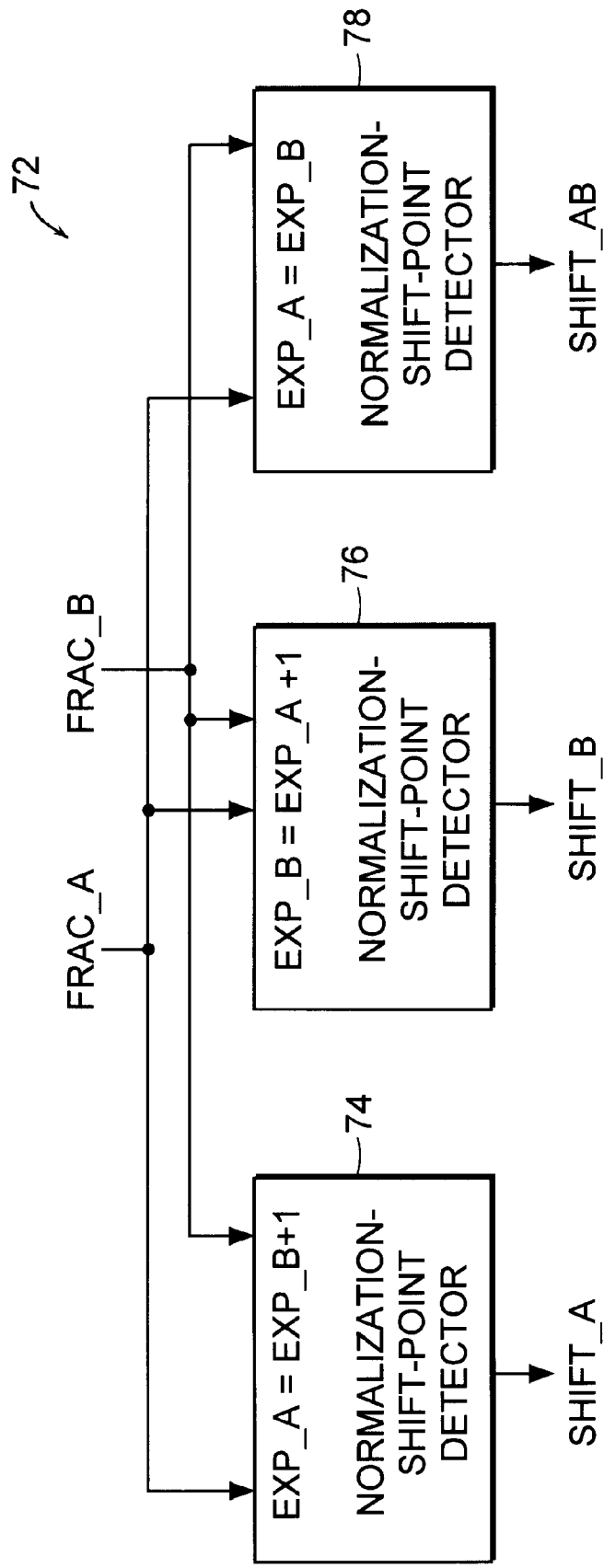
FIG. 6 is a block diagram of shift-point detector employed in the add pipe's first stage.

We now turn to a discussion of the manner in which FIG. 5's normalization-prediction circuit 56 determines the required normalization shift. As FIG. 5 shows, circuit 56 includes a shift-point detector 72. A correct prediction of the most-significant one bit's position depends on proper mantissa alignment. Since the proper mantissa alignment is not yet known when circuit 56 begins operation, shift-point detector 72, which FIG. 6 shows in more detail, actually comprises three parallel shift-point detectors 74, 76, and 78 that respectively perform bit-comparison operations for the three alignments possible when the exponent difference is zero or one, and a multiplexor 80 in FIG. 5 selects from among those outputs in response to the output of a two-bit alignment predictor 81.

Figure 7:
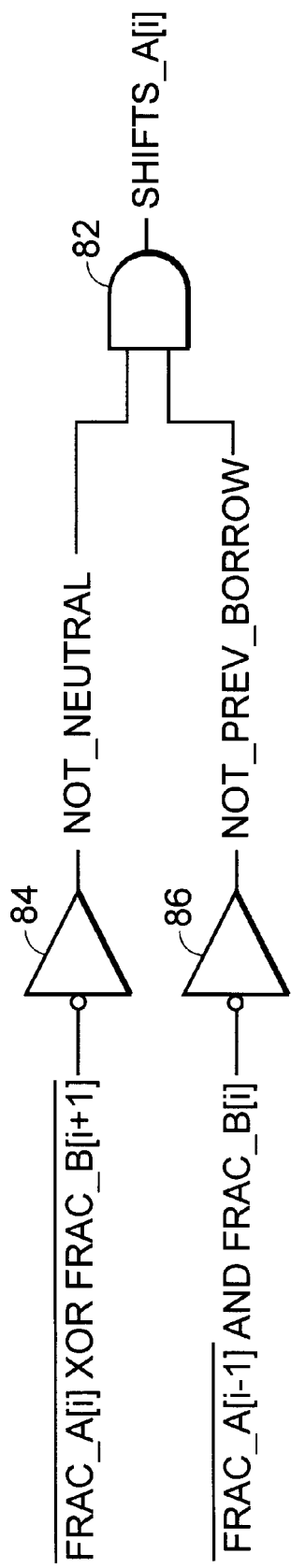
FIG. 7 is a block diagram of the logic for generating one bit of one of the three alternative outputs of FIG. 6's shift-point detector.

Each of shift-point detector 72's outputs is a vector that includes, for each mantissa position, a bit that indicates whether corresponding operand bits fit a pattern that could produce the most-significant one bit, or at least the zero bit to the immediate left of the most-significant one bit. FIG. 7 illustrates how each vector bit is generated in the case of the shift-point detector 74 whose output will be selected if operand A's exponent is one greater than operand B's.

In that situation, the ith bit FRAC_A[i] of operand A's mantissa FRAC_A should be aligned with the (i+1)st bit FRAC_B[i+1] of operand B's mantissa, where higher-index bits are more significant. And if FRAC_A[i] differs from FRAC$_{13}$B[i+1], the corresponding bit in the difference between FRAC_A and FRAC_B is a one if the bit position to the right does not generate or propagate a borrow. So AND gate 82 generates a logical-one output when gate 84 indicates that FRAC_A[i] differs from FRAC$_{-B[i}$+1] and gate 86 indicates no apparent borrow in the position to the right, i. e., that a zero value of FRAC_A[i−1] does not coincide with a one value of FRAC$_{-B[i]}$.

Actually, a logical one from gate 82 does not necessarily indicate that the mantissa difference will have a one in that position, because actual borrows can be propagated even when there is no apparent borrow in the position to the right. Specifically, a borrow can be propagated to a given position when the operands' bits to the right are the same. In that case, though, the position to the right in the mantissa difference will necessarily be a one. So a one at a given position in circuit 74's output means that, if operand A's exponent is one greater than operand B's, the mantissa difference has a one either in the corresponding bit or in the bit to the right of it.

If FIG. 5's multiplexor 80 selects circuit 74's output, then an excess-one stripper 88 leaves the most-significant one in that output and removes all ones less significant, so stripper 88's output is a decoded indication of the number of positions by which the operands should be shifted to result in a mantissa difference that is either normalized or requires only a one-position shift before it is.

Figure 8:
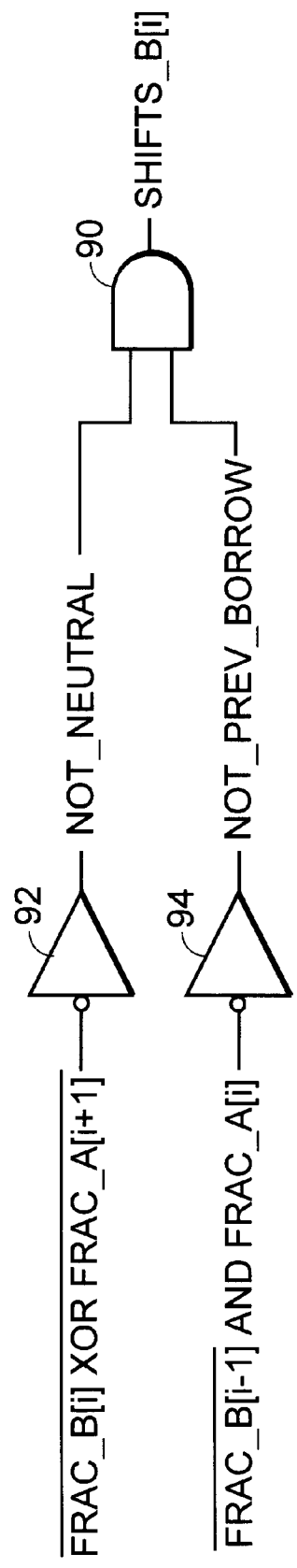
FIG. 8 is a block diagram of the logic for generating one bit of another of the three alternative outputs of FIG. 6's shift-point detector.

Inspection of FIG. 8 reveals that its gates 90, 92, and 94 perform the corresponding operation for the situation in which operand B's exponent is one greater than operand A's.

Figure 9:
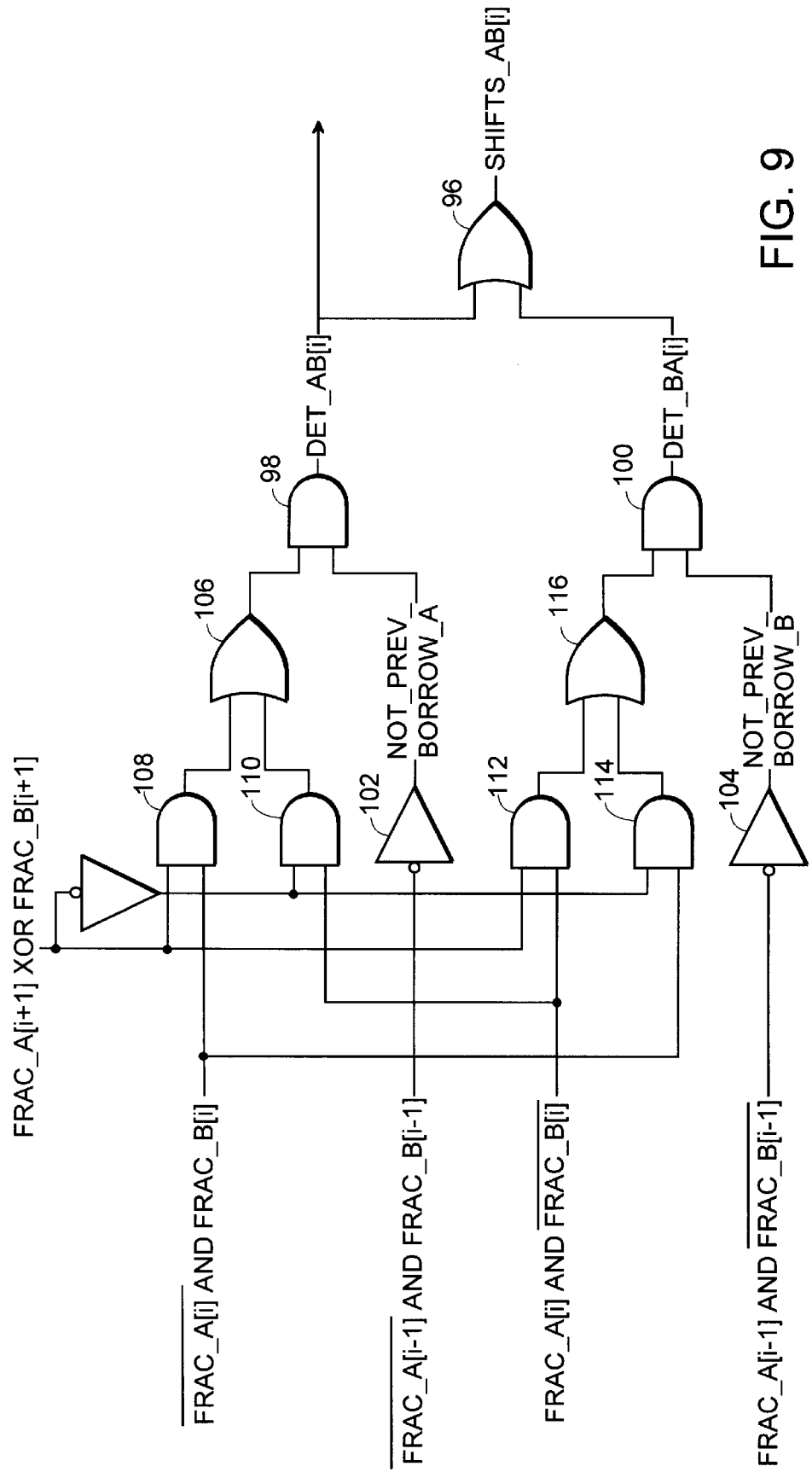
FIG. 9 is a block diagram of the logic for generating one bit of the remaining one of the three alternative outputs of FIG. 6's shift-point detector.

The designs of FIGS. 7's and 8's circuits are based on respective assumptions regarding which aligned mantissa will be greater. This assumption can be made reliably because the mantissa of a larger-exponent operand is necessarily larger after alignment. But FIG. 6's shift-point detector 78 is used for the situation in which the exponents are the same, so no such assumption can be made in its design. As FIG. 9 shows, therefore, that circuit's OR gate 96 generates a logical-one output in response to logical-one values of either of two signals DET_AB[i] and DET_BA[i], the former being based on the assumption that operand A's mantissa is greater, and the latter being based on the assumption that operand B's is. Just as FIGS. 7 and 8's gates 82 and 90 do, FIG. 9's gates 98 and 100 prevent respective logical-one outputs if respective inverters 102 and 104 report apparent borrows in the mantissas' bit positions to the right. But the other inputs to gates 98 and 100 result from imposing criteria more restrictive than simply that a difference exist between the operand mantissas in the corresponding bit position.

To impose these criteria, the FIG. 9 circuit distinguishes between a "trigger," where the larger mantissa is a one and the smaller is a zero, and an apparent borrow, where the larger mantissa is a zero and the smaller is a one. The two inputs to an OR gate 106 that generates gate 98's other input are generated by gates 108 and 110, which respectively impose criteria for borrow and trigger positions, as will presently be explained. Similarly, gates 112 and 114 respectively impose criteria for borrow and trigger positions on the inputs that they generate to the gate 116 that generates gate 100's other input.

We first consider the criterion that gate 110 imposes on detected triggers. In the mantissa difference that results from the subtraction of one operand from the other, a bit corresponding to a position where the operands form a trigger cannot be the mantissa difference's most-significant logical one if the operand mantissas have a bit difference in the position to the left of that trigger position; a trigger does not propagate a borrow, so that bit difference necessarily results in a mantissa-difference logical one in a position more significant than the one that corresponds to the trigger. Gate 110 therefore forwards its lower input, which is intended to represent detection of a trigger that can result in the mantissa difference's most-significant one bit, only if the operands' mantissas are not different in the bit position to the left.

Now, this interpretation of gate 110's output is based on the assumption that operand A's mantissa is larger than operand B's. But if it is operand B that actually has the greater mantissa, then the bit position in question is actually an apparent borrow, not a trigger, and gate 110 asserts its output erroneously. But requiring the operand-mantissa bits not to differ in the bit position to the left makes this error harmless: since the operand-mantissa bits are the same in the position to the left, the borrow makes the mantissa-difference bit in the position to the left a one bit—i.e., the position in question cannot be that of the mantissa difference's most-significant logical one—so the output of gate 100, which is generated under the assumption that operand B's mantissa is greater, will have a logical one at least at one more-significant position, and FIG. 5's stripper circuit 88 will accordingly remove the result of gate 110's erroneous assertion.

Gate 108 imposes a related restriction for the borrow-detection case. As was just observed, the mantissa-difference bit in the position to the left of one that corresponds to an apparent borrow is necessarily a logical one if the operand-mantissa bits in that left position do not differ from each other, so the position corresponding to that apparent borrow cannot be that of the mantissa difference's most-significant logical one. Gate 108 therefore forwards its lower input, which is intended to represent detection of an apparent borrow, only if the operands' mantissas are not different in the bit position to the left. This criterion makes harmless any erroneous assertion by gate 108 of an apparent borrow, for reasons similar to those described above in connection with gate 110.

For the case in which operand B's mantissa is greater, gates 112 and 114 respectively impose the same criteria as gates 108 and 110 do for the case in which operand A's mantissa is.

As was mentioned above, FIG. 5's multiplexor 80 generates its possible-shift-point-vector output SHIFTS by choosing among FIG. 6's thus-generated three normalization-shift-point-vector signals, and it applies that output to an excess-ones stripper 88, which, as will now be explained by reference to FIG. 10, removes all but the single most-significant one bit from it.

Figure 10:
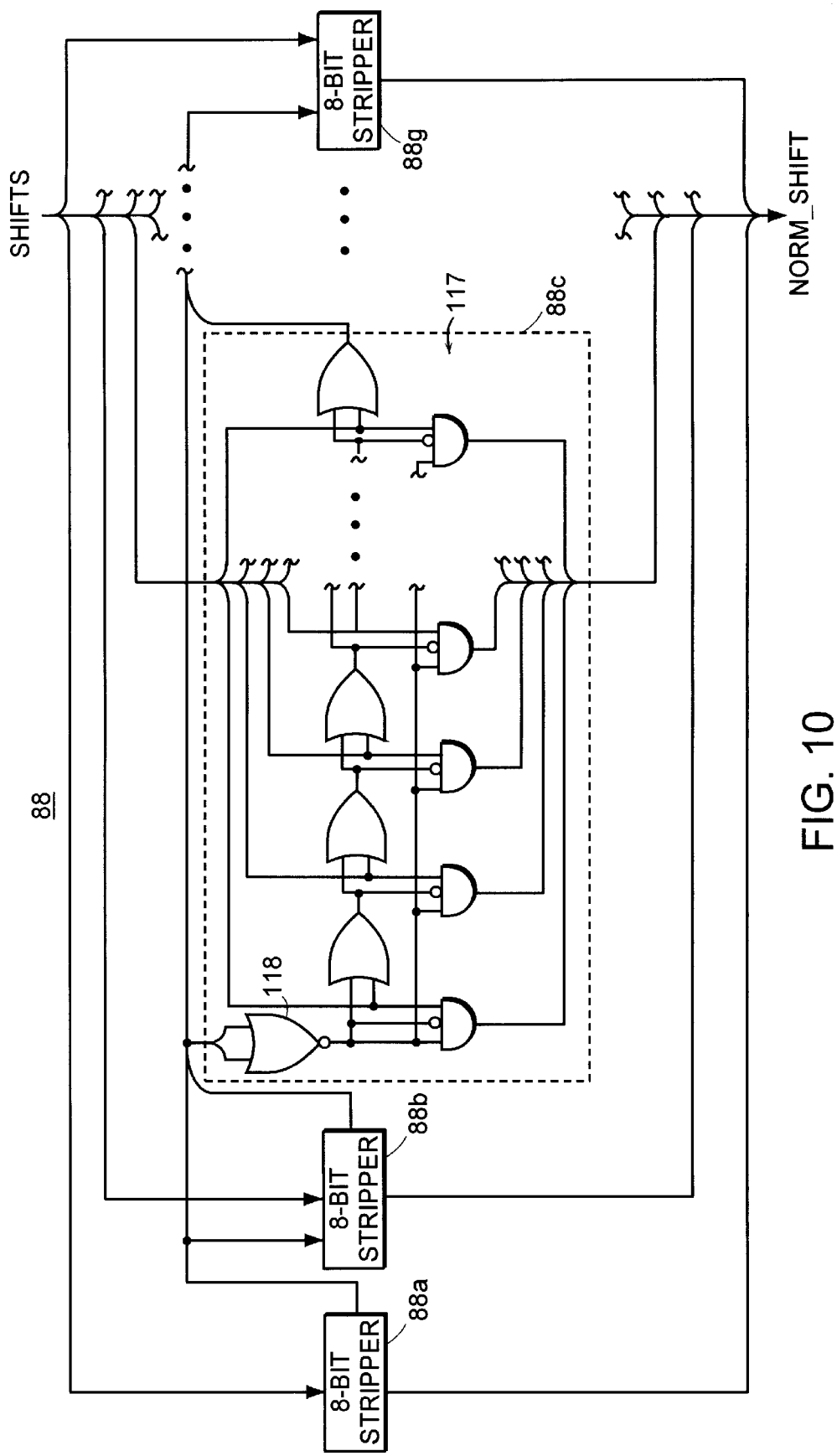
FIG. 10 is a block diagram of FIG. 5's excess-ones stripper.

Specifically, each of a plurality of FIG. 10's single-byte strippers 88a–g receives a respective one of SHIFTS's bytes. (Although the drawing depicts eight such strippers to match the floating-point processor's sixty-four-bit-wide data path, the conventional double-precision-format mantissa actually is only fifty-four bits wide.) A respective one of AND gates 117 forwards any one bit in the SHIFTS signal as a corresponding bit of the normalization-shift vector NORM_SHIFT unless another of that AND gate's inputs disables it. A NOR gate 118 receives from each more-significant single-byte stripper an indication of whether that single-byte stripper's input contains a one at any bit position. If so, gate 118's output disables the AND gates 117. Any AND gate 117 is also disabled if any more-significant bit in the same byte is a one bit.

Figure 1:
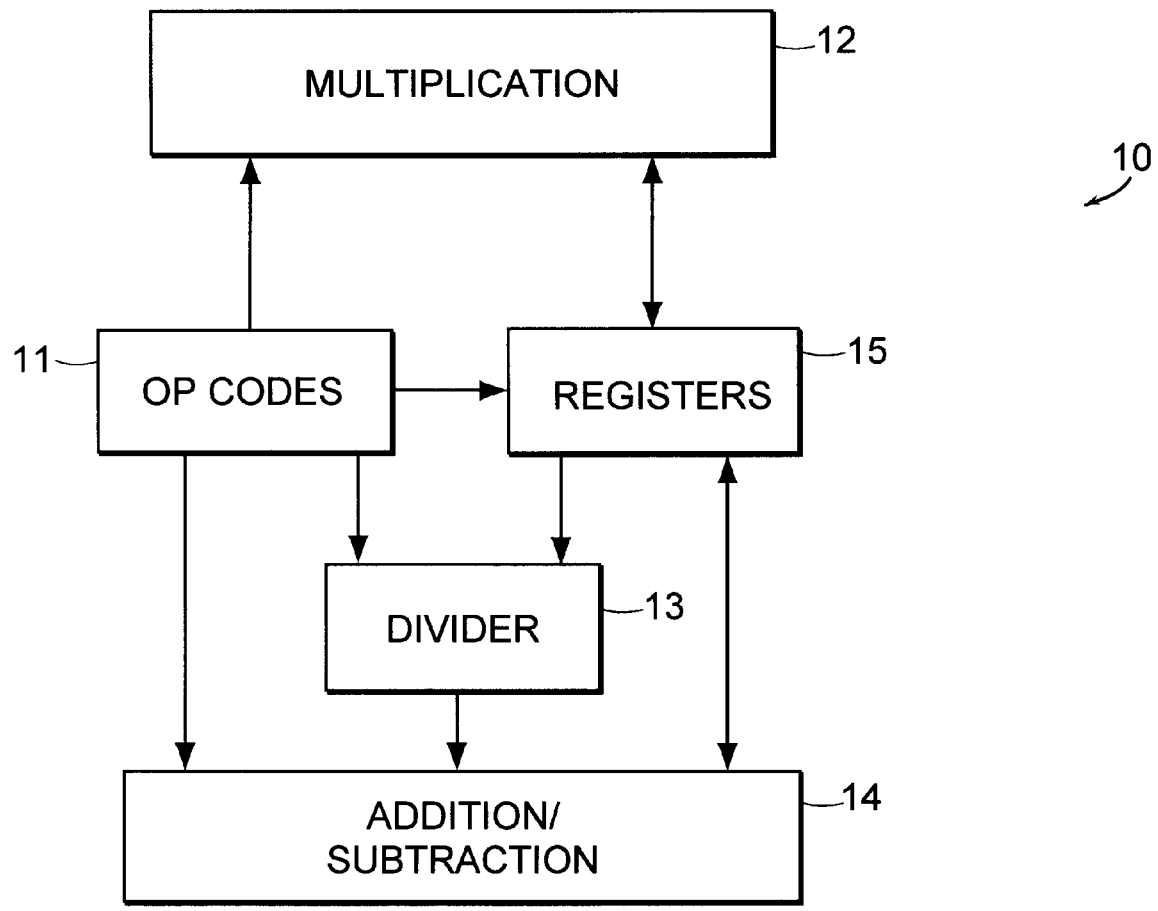
FIG. 1, described above, is a block diagram of a representative floating-point processor.
Figure 2:
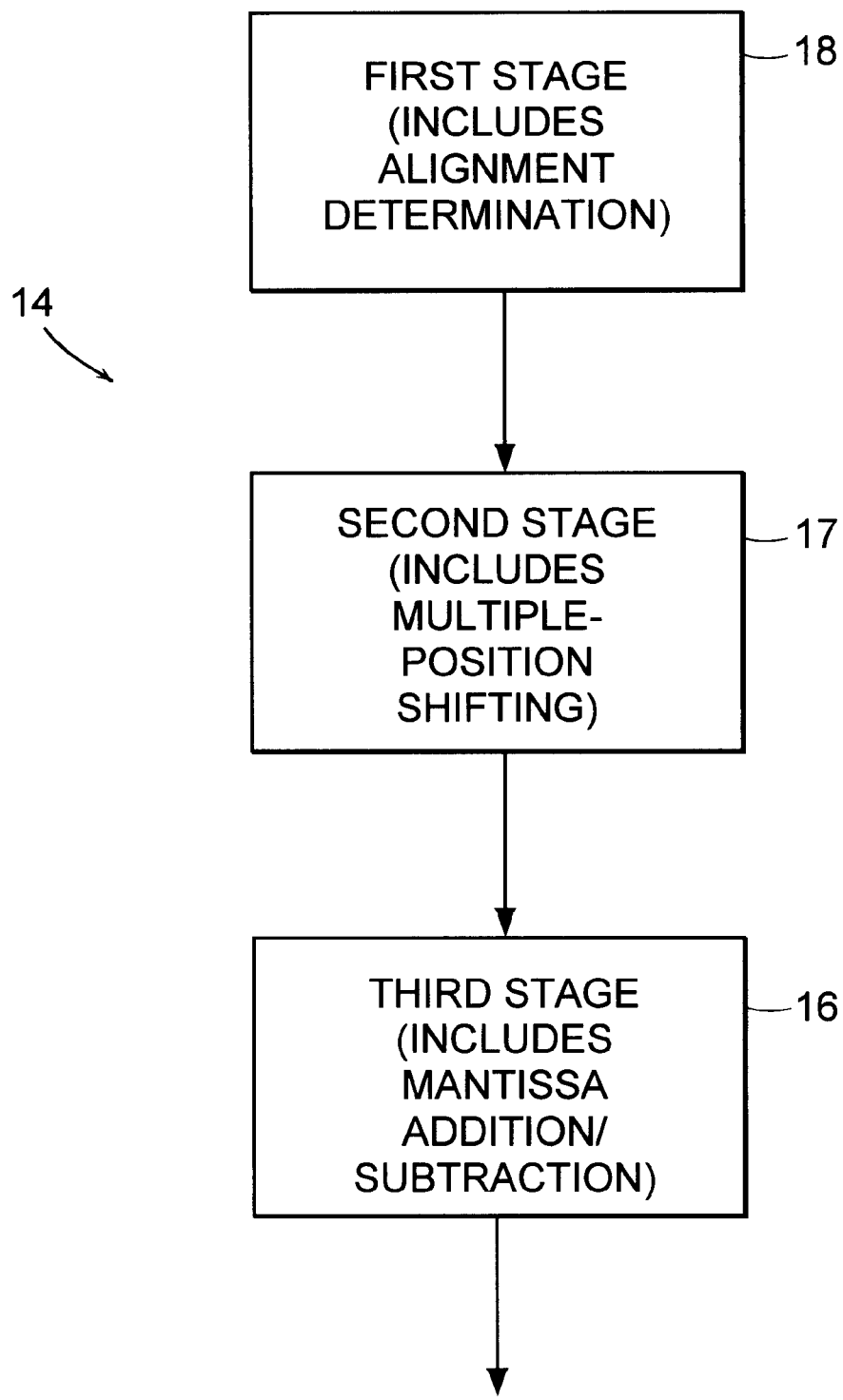
FIG. 2, described above, is a block diagram of such a processor's add pipe.
Figure 3:
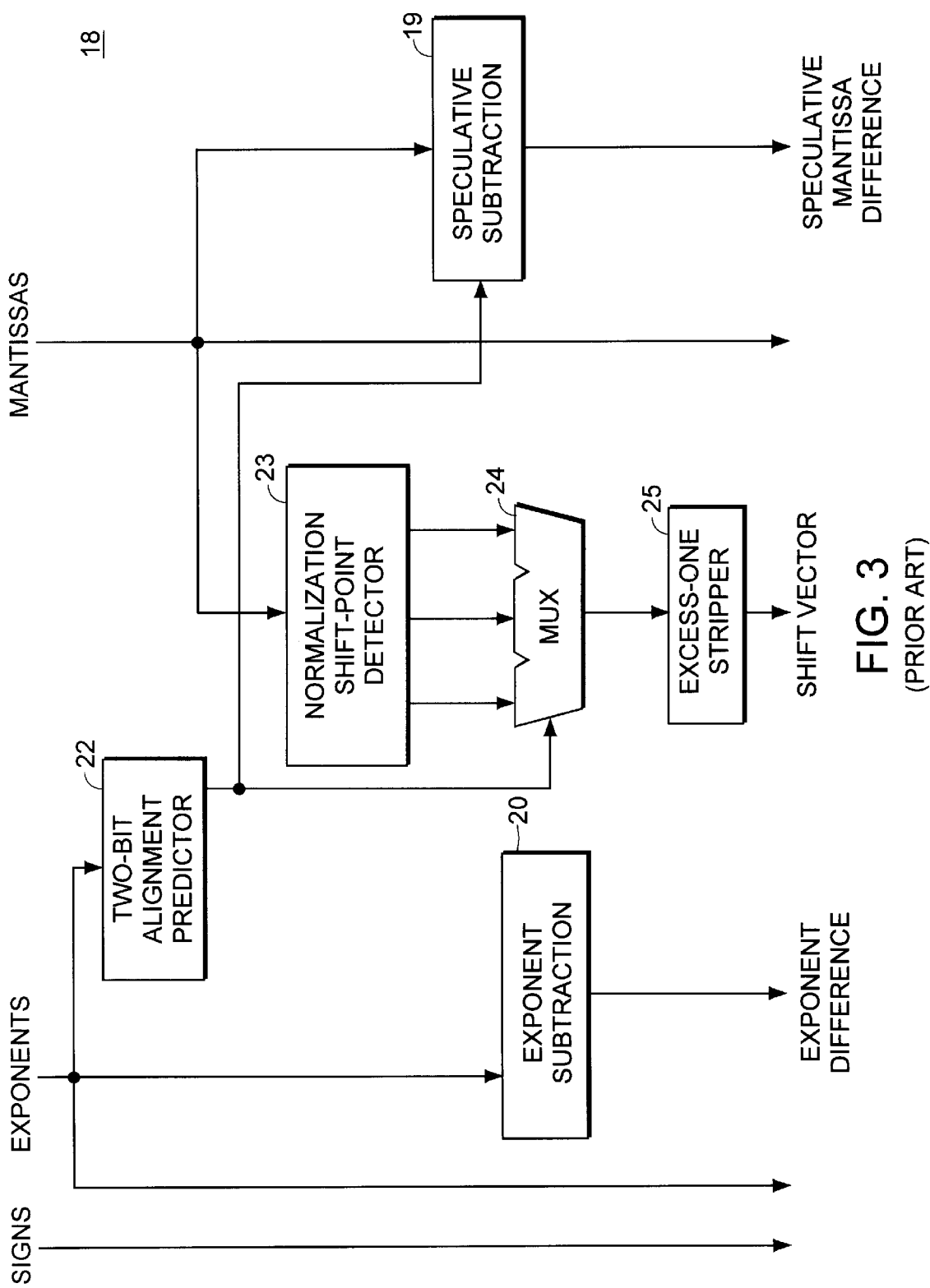
FIG. 3, described above, is a block diagram of a prior-art add pipe's first stage.

As described so far, the operation of FIG. 5's normalization-prediction circuit 56 is essentially the same as that of the corresponding circuit described in the Wolrich et al. patent mentioned above: it sends to the second stage a NORM_SHIFT vector generated by stripping the less-significant logical ones that multiplexor 80 chooses from among the shift-point detector 72's three output vectors. But the Wolrich et al. arrangement employs a full carry-propagation adder such as FIG. 3's predictive subtracter 20 to determine the mantissas' relative sizes and thus indicate whether the predictive subtraction's results need to be complemented in a later stage in order to produce a positive output mantissa. The arrangement of the Sit et al. patent mentioned above similarly uses a full carry-propagation adder in its first stage to determine which mantissa to subtract from which in order to obtain a positive mantissa.

Figure 11:
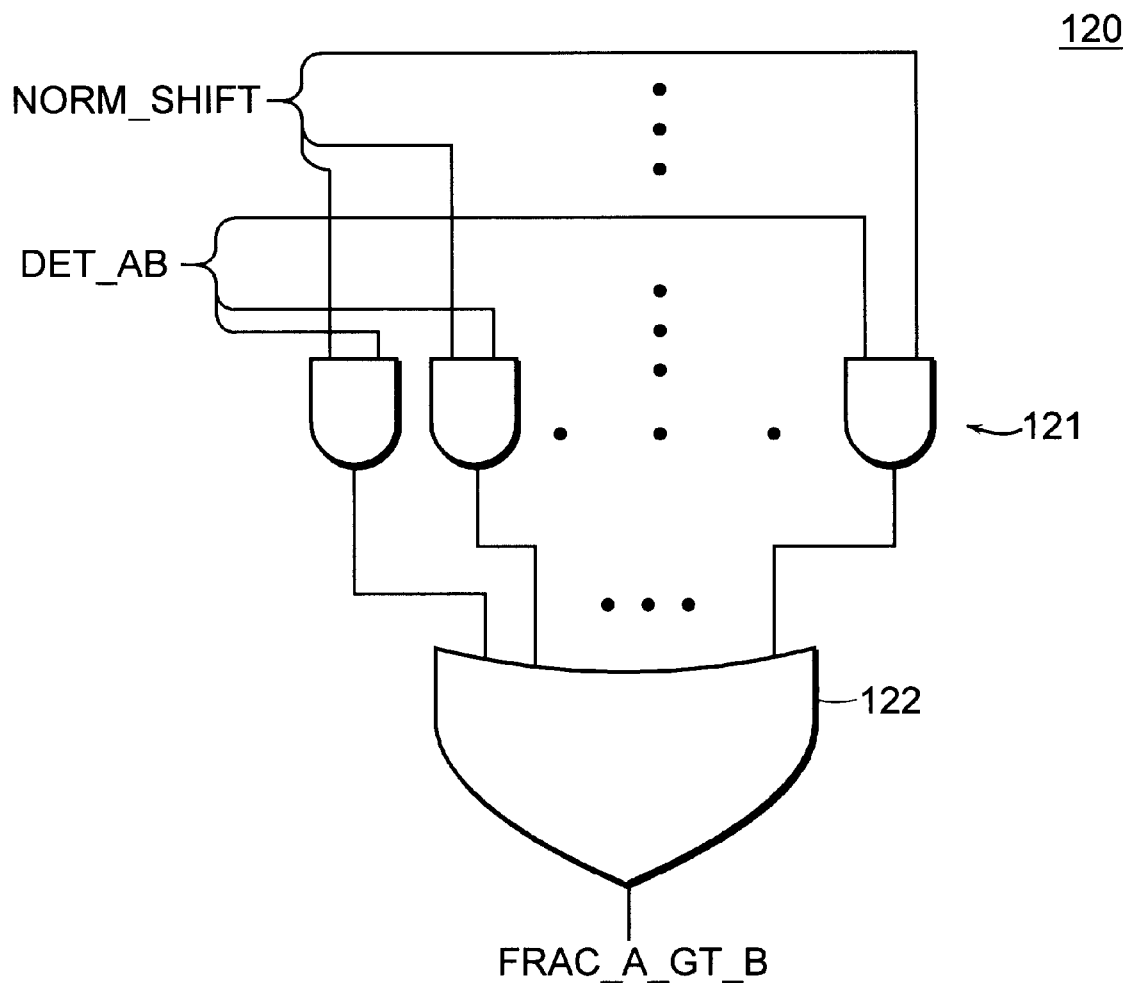
FIG. 11 is a block diagram of the circuitry that the add pipe's second stage employs to infer the relative sizes of equal-exponent mantissas' operands.

We avoid such an adder and its attendant delay, but are still able to generate a positive mantissa efficiently, by using a technique that involves forwarding to the second stage not only the NORM_SHIFT vector that Wolrich et al. do but also a DET_AB vector consisting of FIG. 9's DET_AB[i]'s for all mantissa bit positions. In the second stage, FIG. 4's mantissa-comparison circuit 120 uses DET_AB and NORM_SHIFT to determine which mantissa is larger when the exponents are equal. FIG. 11 depicts circuit 120 in more detail. While FIG. 4's shifters 30 and 32 are performing the normalization shift, FIG. 11's AND gates 121 determine whether the bit chosen as the single logical-one bit in the normalization-shift-position vector NORM_SHIFT was the most-significant of the shift bits DET_AB[i] generated on the assumption that operand A's mantissa is greater than operand B's.

If so, OR gate 122 asserts an output FRAC_A_GT_B, which indicates that operand A's mantissa is indeed greater than or equal to operand B's. This means that FIG. 4's minuend shifter 30 has received the correct mantissa, since FIG. 5's multiplexor 43 steers operand A's mantissa to that shifter when the operands' exponents are the same. Otherwise, if the EFF_SUB and EDIFF_EQ_ signals indicate that the operands' exponents are equal in an effective subtraction, FIG. 4's gate 124 asserts its output INVERT, and the addition/subtraction circuit 34 accordingly subtracts FRAC_MIN from FRAC_SUB, rather than vice versa. Consequently, addition/subtraction circuit 34's output is positive, as it is required to be.

The add-pipe output's sign and exponent can be determined in any conventional way. For the sake of example, FIG. 4 includes a multiplexor 130 that determines the output's sign by choosing between the operands' signs on the basis of a signal A_GT_B that indicates which operand is greater in magnitude. In the illustrated embodiment, a multiplexor 132 generates A_GT_B by forwarding the sign output of FIG. 5's exponent subtracter 38 unless the exponent difference is zero, in which case it forwards FRAC_A_GT_B. If a signal NOM_SUB that FIG. 5's circuit 36 generates from the operation code indicates that a nominal subtraction was requested, then FIG. 4's XOR gate 134 first inverts the sign of the nominal subtrahend, operand B. Multiplexor 30's resultant output is the add pipe's sign output SIGN.

Since a de-asserted LOW_EDIFF_SUB signal does not result in the second-stage shifters' performing any normalization, the operation result's exponent should simply be the larger of the two input exponents EXP_A and EXP_B unless normalization occurs further on in the processing chain. So FIG. 5's multiplexor 136 generates a preliminary exponent output signal EXP_AB by selecting between EXP_A and EXP_B in accordance with the sign of the exponent subtractor 38's output, and if the LOW_EDIFF_SUB signal does not indicate that the second-stage shifters performed normalization, EXP_AB is the signal that FIG. 4's multiplexor 138 forwards for further processing to arrive at the exponent output.

A multiplexor 140 forwards that signal further unless the EFF_SUB signal indicates that an effective subtraction is occurring, in which case multiplexor 140 instead forwards the result of an adder 142's decrementing that signal's value to reflect the effective-subtraction pre-shift. And if the final mantissa addition or subtraction results in a carry, a further multiplexor 144 in FIG. 4 selects the result of a further adder 146's incrementing multiplexor 142's output by one. This incrementing reflects the fact that the mantissa adder 34 will perform an additional right shift in that case for normalization purposes, as will be explained below in connection with FIG. 12.

When LOW_EDIFF_SUB is asserted, on the other hand, the second-stage shifters perform normalization, so the output exponent should be adjusted accordingly. To that end, multiplexor 138 forwards a value that an adder 148 generates by subtracting the size of the normalization shift from the larger-operand exponent EXP_AB. To generate the signal that represents the normalization-shift size, an encoder 150 encodes the normalization-shift vector NORM_SHIFT. Multiplexor 138's output is then processed as before to generate the output exponent EXP.

We now turn to the reason for the extra one-bit leftward shift in the case of effective subtractions. Its purpose is to simplify rounding and final-normalization operations that the mantissa adder 34 performs. Before we describe that simplification in connection with FIG. 12, we consider those rounding and final-normalization operations by simplified examples.

Suppose that an add pipe affording only five-bit output-mantissa resolution is to add $0.11011 \times 2^5 + 0.11101 \times 2^2$, i.e., 27+3.625 in fixed-point decimal. Table 1's first two rows represent the alignment of the two mantissas. The completely precise sum, $0.11110111 \times 2^5$, requires eight bits, i.e., more than the add-pipe output's five-bit resolution, so this sum's bits less significant than mantissa A's least-significant, L bit cannot be retained in the five-mantissa-bit output. (In practice, the five mantissa bits would physically be represented outside of the adder by only four bits; since all floating-point quantities are normalized, the first bit, which must accordingly be a one, is only implicit.) For accuracy purposes, though, the adder 34 internally operates on two further bits, the R and G bits. So only one of mantissa B's is omitted from the initial addition. Table 1's third row represents the sum of that addition.

Now, if only the resultant bits that correspond in significance to those of the five output bits are considered, the result is 30. But this is not as close to the precise sum. i.e., 30.625, as can be achieved with a five-bit mantissa: $0.111111 \times 2^5 = 31$ is closer. So a common way of rounding is to add half the output quantization interval to the raw sum before truncation, i.e., to add a one in the bit position one less significant than the raw-sum bit that corresponds to the least-significant output bit, as Table 1's fourth and fifth rows show.

TABLE 1

|  | C |  |  |  |  | L | R | G |  | Decimal |
|---|---|---|---|---|---|---|---|---|---|---|
| A | 0 | 1 | 1 | 0 | 1 | 1 |   |   |  | 27 |
| B |   |   |   | 0 | 1 | 1 | 1 | 0 |  | 3.625 |
| Raw Sum | 0 | 1 | 1 | 1 | 1 | 0 | 1 | 0 |  | 30.5 |
| Round Bit |   |   |   |   |   |   | 1 | 0 |  |  |
| Rounded |   | 1 | 1 | 1 | 1 | 1 | 0 | 0 |  | 31 |

We note here that this is not the only rounding mode that high-performance add pipes typically implement. Another mode, known as "round to nearest even," is the same as the approach just described, with one exception. If mantissa B in that example had been exactly 3.5 before truncation, so that the exact sum would have been 30.5 and thus is equidistant between 30 and 31, then the round-to-nearest-even approach would round to 30 (the "nearest even") rather than 31, as the illustrated approach would. The round-to-nearest-even approach sets the L bit to zero if "sticky bit" circuitry, which records the significance of the least-significant one bit in the smaller-exponent operand's pre-truncation mantissa, indicates that no one bits were discarded during truncation. Another mode, whose purpose is to round to the next higher quantization level, usually adds a full quantization interval before truncation rather than half one, but only if the overall addition's sign will be positive. And there are still further approaches, too.

Figure 12:
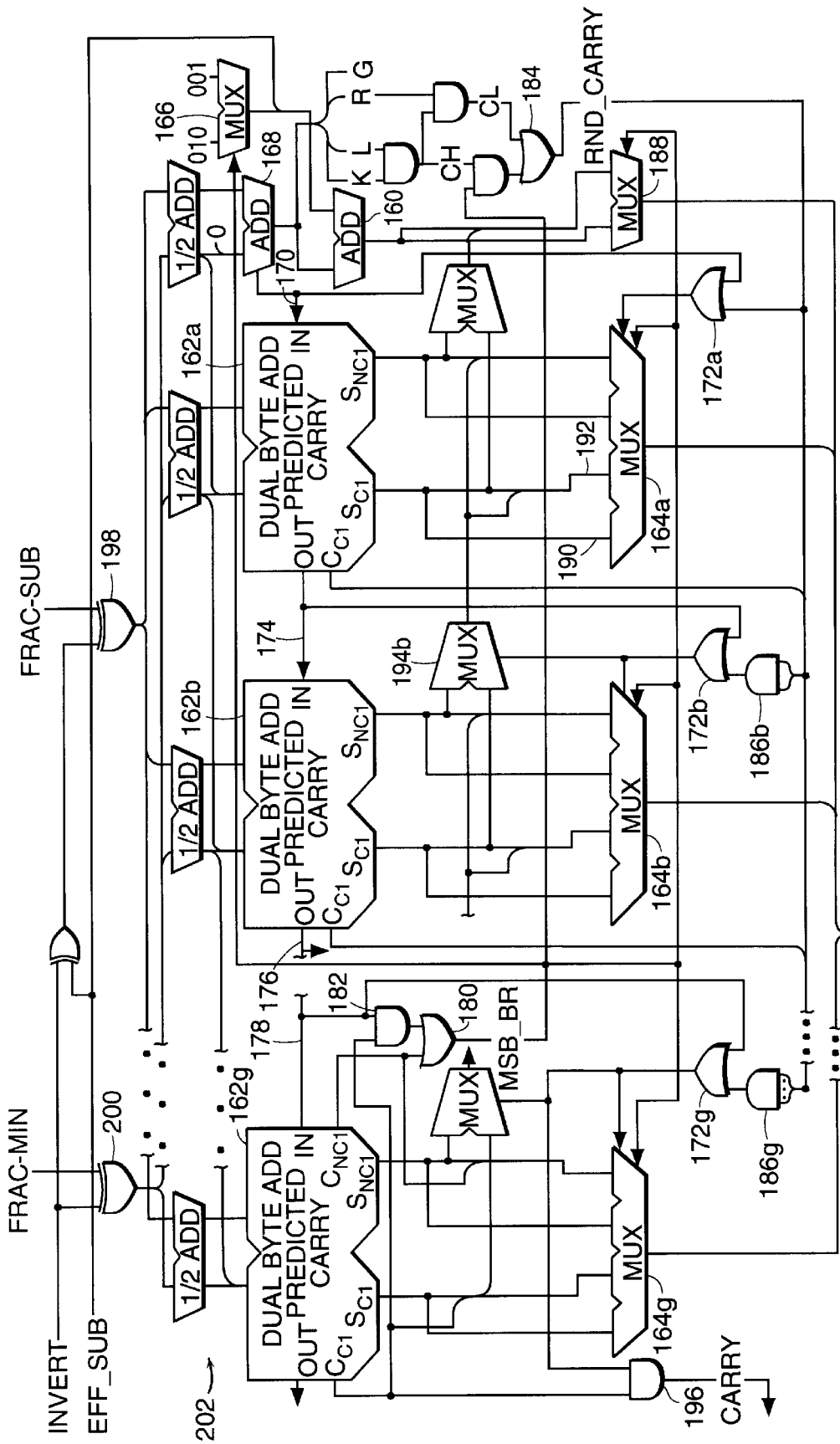
FIG. 12 is a more-detailed block diagram of the main mantissa adder included in FIG. 4's third-stage circuitry.

To avoid unnecessarily complicating the discussion, we assume only a single rounding mode here and in the FIG. 12 discussion. But other modes also share a complication that will now be illustrated by reference to Table 2's illustration of that single mode. Specifically, the bit position at which the round bit needs to be added depends on the raw sum. In the Table 2 example, the addition produces a carry, and the result of the rounding will not be satisfactory if the round bit is again added in the R-bit position. Table 2's fourth through sixth rows show the result of (inappropriately) doing so. Because there is a carry, a rightward normalization shift is necessary, and the resultant output is 32, whereas the infinite-precision result would be 33.375. Although a five-bit mantissa cannot represent the quantity 33, it can represent 34, which is still closer to the infinite-precision result than Table 2's output.

TABLE 2

|   | C |   |   |   |   |   | L | R | G |   | Decimal |
|---|---|---|---|---|---|---|---|---|---|---|---------|
| A | 0 | 1 | 1 | 1 | 1 | 0 |   |   |   |   | 30 |
| B |   |   |   | 0 | 1 | 1 | 0 | 1 |   |   | 3.375 |
| Raw Sum | 1 | 0 | 0 | 0 | 0 | 1 | 0 | 1 |   |   | 33.25 |
| Round Bit |   |   |   |   |   |   |   |   | 1 |   |   |
| Rounded | 1 | 0 | 0 | 0 | 0 | 1 |   | 1 | 1 |   |   |
| Normalized |   | 1 | 0 | 0 | 0 | 0 |   |   |   |   | 32 (÷2) |

To deal with this problem, rounding adders conventionally inspect the initial addition's carry bit and add the round bit in the L-bit position if that carry bit is set. Table 3 illustrates thus adding the round bit in the proper, L-bit position.

TABLE 3

|   | C |   |   |   |   |   | L | R | G |   | Decimal |
|---|---|---|---|---|---|---|---|---|---|---|---------|
| A | 0 | 1 | 1 | 1 | 1 | 0 |   |   |   |   | 30 |
| B |   |   |   | 0 | 1 | 1 | 0 | 1 |   |   | 3.375 |
| Raw Sum | 1 | 0 | 0 | 0 | 0 | 1 | 0 | 1 |   |   | 33.25 |
| Round Bit |   |   |   |   |   |   | 1 |   |   |   |   |
| Rounded | 1 | 0 | 0 | 0 | 1 |   | 0 | 1 | 1 |   |   |
| Normalized |   | 1 | 0 | 0 | 0 | 1 |   |   |   |   | 34 (÷2) |

Tables 2 and 3 also illustrate another sum-dependent aspect of floating-point processing: if a carry occurs, the adder must perform a post-addition normalization shift to the right.

Conventionally, moreover, the choices are not just between not shifting and shifting to the right. If the operation is a conventional effective subtraction, the direction of the post-addition normalization must be to the left, as Table 4 illustrates.

TABLE 4

|   | C |   |   |   |   |   | L | R | G |   | Decimal |
|---|---|---|---|---|---|---|---|---|---|---|---------|
| A | 0 | 1 | 0 | 0 | 0 | 1 |   |   |   |   | 17 |
| B |   |   |   |   | 1 | 0 | 0 | 1 |   |   | 2.375 |
| 2's Compl. | 1 | 1 | 1 | 1 | 0 | 1 | 1 | 0 |   |   | −2.375 |
| Raw Sum | 0 | 0 | 1 | 1 | 1 | 0 | 1 | 0 |   |   | 14.5 |
| Round Bit |   |   |   |   |   |   |   | 1 |   |   |   |
| Rounded | 0 | 0 | 1 | 1 | 1 | 1 | 0 | 1 |   |   | 14.5 |
| Normalized |   | 1 | 1 | 1 | 1 | 0 |   |   |   |   | 14.5 (×2) |

(Table 4's third row represents the two's complement of mantissa B's complete-precision value, not the two's complement of the truncated value that the mantissa adder receives. Obviously, the mantissa adder cannot add a one bit at the complete-precision value's least-significant bit position, as is necessary to two's-complement the illustrated mantissa with complete precision. But it can obtain the truncated version of that result by using well-known "sticky bit" circuitry, not shown in the drawings, that notes whether any one bits were discarded during truncation and, if so, suppresses the mantissa adder's addition of a one to the G-bit position during the two's-complementing process. This is equivalent to adding the one bit at the least-significant position before truncation.)

Table 4 also shows that the round bit conventionally must be added in the G position to achieve 14.5, which is the five-bit number closest to the exact answer of 14.625. As Table 5 shows, the result would be 15.0 rather than the more-accurate 14.5 if the round bit were instead added in the R position.

TABLE 5

|   | C |   |   |   |   |   | L | R | G |   | Decimal |
|---|---|---|---|---|---|---|---|---|---|---|---------|
| A | 0 | 1 | 0 | 0 | 0 | 1 |   |   |   |   | 17 |
| B |   |   |   |   | 1 | 0 | 0 | 1 |   |   | 2.375 |
| 2's Compl. | 1 | 1 | 1 | 1 | 0 | 1 | 1 | 0 |   |   | −2.25 |
| Raw Sum | 0 | 0 | 1 | 1 | 1 | 0 | 1 | 0 |   |   | 14.75 |
| Round Bit |   |   |   |   |   |   | 1 |   |   |   |   |
| Rounded | 0 | 0 | 1 | 1 | 1 | 1 | 0 | 1 |   |   | 15.25 |
| Normalized |   | 1 | 1 | 1 | 1 | 0 |   |   |   |   | 15.0 (×2) |

But because the bit positions that FIG. 4's shifters 30 and 32 produce for effective subtractions is one bit to the left of the positions that they produce for effective additions, the mantissa adder 34 never needs to add the round bit in the G position or to shift its results to the left for normalization.

To appreciate the resultant simplification, consider FIG. 12's simplified representation of a high-performance mantissa adder. A lowest-nibble adder 160 and dual byte adders 162a, b, ... g (collectively, "162") generate the actual sum bits by operating on the results of some preprocessing of the minuend and subtrahend mantissas FRAC_MIN and FRAC_SUB.

These adders speed the addition process by breaking the addition into nibble- or byte-sized segments. Recall that the sum and carry bits from a given bit position of a full adder depend not only on the corresponding two input bits but also on the carry out of that adder's bit position to the right, which in turn depends in part on the carry out of one further bit to the right, and so on. To avoid the delay that this propagation of carry results from low bits to high bits could cause in the addition of, say, fifty-four-bit mantissas, the dual byte adders 162 do not wait for the lower-significance adders' carry results. Instead, they perform two additions in parallel, one producing a sum $S_{CI}$ based on the assumption of a carry in from the next-most significant byte adder and the other producing a sum $S_{NCI}$ based on the assumption of no such carry.

Multiplexors 164a, b, ..., g (collectively, "164") then choose the correct alternative result when it is known where carries in have occurred. They are depicted as four-to-one multiplexors because they not only make that selection but also perform post-addition normalization by selecting between unshifted and right-shifted versions of the correct alternative. The manner in which this normalization is performed will be explained after a discussion of the way in which the add pipe chooses the correct alternative sum $S_{CI}$ or $S_{NCI}$.

We begin that discussion with the lowest-nibble adder 160. This adder actually adds the round bit, generated by a multiplexor 166, to the raw sum's lowest nibble, generated by a single nibble adder 168. If adder 168's carry output 170 indicates that there is a carry out of the raw sum's lowest nibble, an OR gate 172a asserts one of the select inputs of multiplexor 164a, which responds by choosing the sum $S_{CI}$ that adder 162a generated by assuming that there would be a carry out of the lowest nibble.

Note that adder 168's output is the low nibble of the raw sum, i.e., of the sum before rounding. This means that there could be a carry out of the low nibble without output 170's necessarily being asserted, yet $S_{CI}$ would still need to be chosen. When this happens, OR gate 172a's other input is asserted, as will be explained below, and multiplexor 164a still makes the correct selection.

Adder 168's carry output 170 is also the basis for adder 162a's generation of its predicted-carry output 174, which adder 162b uses in generating its predicted-carry output 176, and so on until the predicted-carry input 178 of the highest-significance adder 162g indicates whether its byte receives a carry in computing the raw sum. If predicted-carry output 174 or 178 indicates a carry, respective OR gate 172b or 172g asserts the associated select input of respective multiplexor 164b or 164g to choose the respective $S_{CI}$ value. If a given OR gate- 172 output is unasserted, then the respective multiplexor forwards the respective $S_{NCI}$ value instead.

The reason why carry signals 174, 176, and 178 are referred to as "predicted" is that each is actually generated in parallel with part of the carry calculation that enters into its associated adder's $S_{CI}$ and $S_{NCI}$ generation. A single-bit segment of a full adder can be thought of as consisting of two stages. The first stage's output indicates whether the corresponding two addend bits (1) are both ones and will therefore produce a carry, (2) are a one and a zero and will therefore propagate any carry received from the bit position to the right, or (3) are both zeroes and will therefore "kill" such a carry. All bit positions' first stages can operate completely in parallel because the output of each depends only on the two corresponding operand bits. The illustrated embodiment's byte adders generate the carry-predict outputs in response to their first stages' outputs by employing circuitry that operates in parallel with the adders' second-stage circuits.

A given bit position's second stage is what generates that bit position's sum and carry results. In doing so it uses not only the corresponding first stage's generate/propagate/kill output but also the carry from the second stage of the bit position to the right: carries must ripple through successive bit positions. Instead of waiting for the second stages' rippling to determine whether there will be a carry out of a given byte, the carry-predict circuitry responds to the byte adder's constituent individual-bit generate/propagate/kill outputs by producing group generate/propagate/kill outputs that indicate whether the byte adder will generate a carry, propagate a carry from the previous adder if one is received, or kill such a received carry. Then, when the predicted-carry input from the previous adder becomes valid, the carry-predict circuitry determines its predicted carry from that input and the group generate/propagate/kill signals that it has already produced. It turns out that having OR gates 172 use the resultant outputs in determining which of the adders' sum outputs are to be selected is faster than basing that determination on the second stages' carry outputs.

But gates 172 also need an input that predicts whether adding the round bit will cause carries not produced by the raw sum's computation; the carry predictions just described are based only on the raw sum, not the rounded sum. For a given byte to receive is such a carry, the rounded sum's lowest nibble must produce a carry out, and the adders associated with all bytes less significant than the byte in question must generate carries out if they receive carries in.

Whether the rounded sum's lowest nibble will produce a carry out depends on where the round bit is to be added. This in turn depends on whether there will be carry from the highest-significance byte adder 162g. If that adder's output $C_{NCI}$ is asserted, indicating that it will generate a carry even if there is no carry in, then an OR gate 180's output MSB_BR is asserted. This indicates that before rounding the raw sum's most-significant bit, i.e., the bit in the carry position, is a one and that a rightward normalization shift will be needed. An AND gate 182's output also causes MSB_BR to indicate the need for a normalization shift if predicted-carry input 178 indicates that adder 162g's byte receives a carry in before rounding and adder 162g's $C_{CI}$ output indicates that such a carry in will cause a carry out.

As was explained above, a number of considerations can enter into where and if the round bit is to be added. In FIG. 12's simplified representation, though, it is assumed that the only round mode employed is the one in which a round bit is always added and in which the location of its addition depends only on the normalization that the mantissa adder performs. In that mode, MSB_BR's assertion causes multiplexor 166 to choose its 010 input, which in turn causes adder 160 to add a one to the L bit of the raw-sum low-nibble value. (Multiplexor 166's three-bit output is the left three bits of adder 160's right input.) MSB_BR's assertion also gates to one input port of an OR gate 184 a $C_H$ signal, which is asserted if the pre-rounding low nibble's L bit and its most-significant, K bit are both ones. If they are, then adding the round bit at the L position will cause a carry, and OR gate 184 asserts its RND_CARRY output, indicating that the low nibble generates a carry out after rounding. If MSB_BR is not asserted, then multiplexor 166 chooses its 001 input, thereby causing the round bit to be added at the R bit position and producing an otherwise-absent carry only if the K, L, and R bits are all ones. If they are, as indicated by an asserted $C_L$ signal, then OR gate 184 asserts its RND_CARRY output even if MSB_BR is not asserted.

For adder 162a's carry-in output sum $S_{CI}$ to be multiplexor 164a's proper selection even if the raw-sum computation produced no carry into adder 162a, it is necessary only that adding the round bit produce an otherwise absent low-nibble carry. This condition is what RND_CARRY's assertion represents, so it causes OR gate 172a to assert its output and multiplexor 164a to select adder 162a's carry-in output sum $S_{CI}$.

For a higher-significance adder's $S_{CI}$ output to be the proper selection in the absence of a raw-sum carry, the second condition is that all lower bytes produce carries out if they receive carries in. To determine whether both conditions prevail for adder 162b, an AND gate 186b receives the RND_CARRY signal and the previous byte adder 162a's $C_{CI}$ output. Simultaneous assertion of both signals indicates that the round bit's addition will cause a carry into adder 162b's byte, and the resultant assertion of gate 186b's output causes multiplexor 164b to choose the sum output $S_{CI}$ that adder 162b generated by assuming that carry in. Similarly, AND gate 186g causes multiplexor 164g to choose adder 162g's $S_{CI}$ output if the RND_CARRY signal and all previous byte adders' $C_{CI}$ outputs are asserted.

Together with a further multiplexor 188, multiplexors 164 also shift the selected sum segments to the right if normalization is required. Suppose, for example, that OR gate 172a asserts its output, thereby indicating to multiplexor 164a that the associated adder 162a's carry-in sum $S_{CI}$ should be used. If that multiplexor's other selection input. MSB_BR, is not asserted, then multiplexor 164a selects its leftmost input 190. But if MSB_BR is asserted, indicating the need for a normalization shift, then multiplexor 164a instead selects input 192. That input consists of the seven high bits of adder 162a's carry-in sum $S_{CI}$ and, concatenated to their left, multiplexor 194b's output, which is the least-significant bit of adder 162b's selected output.

In theory, such a shift should occur not only when MSB_BR is asserted, indicating a set carry bit before rounding, but also when the carry bit is set only after rounding, in which case MSB_BR would be unasserted. But the shift is unnecessary in practice, since the normalization in that case is always from 1.000 . . . to 0.100 . . . ; it merely shifts the sole one-valued bit into the "hidden bit" position, which outside the floating-point processor is only implicit. So if the carry occurs only after rounding, the output is all zeroes regardless of whether the output multiplexors 164 and 188 perform a normalization shift.

Still, the exponent must be incremented in that case. So when gate 172g's output indicates that the most-significant-byte adder 162 is to receive a carry in and that adder's $S_{CI}$ output indicates that a carry out will result from a carry in, an AND gate 196 sends FIG. 4's multiplexor 144 an asserted CARRY signal. Thus causes it to select the incremented exponent value.

It was mentioned above that the inputs to adders 162 and 168 result from initial processing of the mantissa adder's input FRAC_MIN and FRAC_SUB. When the operation is an effective subtraction, as indicated by an asserted EFF_SUB signal, one part of that initial processing is two's complementing of the subtrahend: subtraction is performed by adding the subtrahend's two's complement to the minuend. To take the two's complement of a number, that number is bitwise complemented and a one bit is added at the result's least-significant bit position. FIG. 12 represents the one-bit addition by EFF_SUB's concatenation with multiplexor 166's round-bit output to produce the value that adder 160 adds to the raw sum's low nibble. (For the sake of simplicity, we omit the sticky-bit circuitry, mentioned above in connection with Table 4, which causes concatenation of a zero instead of a one if any one bits were discarded in the alignment process.)

In most effective subtractions, FRAC_SUB is to be subtracted from FRAC_MIN, so it is FRAC_SUB that is complemented: XOR gates 198 ordinarily complement FRAC_SUB when EFF_SUB is asserted. But when the INVERT signal indicates the FRAC_MIN is actually the smaller mantissa, FRAC_MIN should be subtracted from FRAC_SUB, so gates 198 pass FRAC_SUB uninverted, and gates 200 invert FRAC_MIN.

Half adders 202 perform the other part of the initial processing. The half adders' purpose is to eliminate a problem that results from the fact that a rounding adder actually adds three numbers rather than just two: it adds not only the two mantissas but also a value represented by the round bit. Now, when two binary numbers are added, there are only two carry possibilities at a given bit position: either a one is carried out of that position or it is not. The dual adders 162 are based on this assumption: they produce only two alternative sums. In the absence of the preprocessing, though, the addition of three numbers would add a third possibility: a carry out of $10_2$, as Table 6 illustrates.

TABLE 6

|  |  |  | Low Nibble K L R G | Decimal |
|---|---|---|---|---|
| FRAC_MIN |  |  | 1 1 | 3 |
| FRAC_SUB |  |  | 1 1 1 1 | 3.75 |
| Round Bit |  |  | 1 0 1 | 1.25 |
| Low-Nibble Sum |  |  | 0 0 0 0 |  |
| Carry out |  | 1 0 |  |  |
| Total | 1 | 0 | 0 0 0 0 | 8 |

This would necessitate the first byte adder 162a's being a triple byte adder rather than a dual byte adder, and it would complicate the output multiplexing and selection. To avoid such complications, the half adders convert the two input mantissas into a different pair of mantissas that have the same sum. Specifically. FRAC_MIN and FRAC_SUB are converted to FRAC_X and FRAC_Y, where each bit of FRAC_X is the corresponding bit of the half adders' sum output and each bit of FRAC_Y is the (half-adder) carry from the previous bit position:

FRAC_X[i]=FRAC_SUB[i] XOR FRAC_MIN[i]
FRAC_Y[i]=FRAC_SUB[i-1] AND FRAC_MIN[i-1]

It turns out that such a conversion eliminates the extra-carry problem, as Table 7 illustrates, by shifting the value of one of the carries into the byte to the left before the raw addition occurs.

TABLE 7

|  |  | Low Nibble L R G | Decimal |
|---|---|---|---|
| FRAC_MIN |  | 1 1 | 3 |
| FRAC_SUB |  | 1 1 1 1 | 3.75 |
| FRAC_X |  | 0 0 1 1 | 0.75 |
| FRAC_Y | 1 | 1 0 0 0 | 6 |
| Round Bit |  | 1 0 1 | 1.25 |
| Low-Nibble Sum |  | 0 0 0 0 |  |
| Carry Out | 1 |  |  |
| From Next Byte | 1 |  |  |
| Total | 1 0 | 0 0 0 0 | 8 |

Perusal of FIG. 12 in light of the foregoing discussion reveals the simplification that the effective subtraction pre-shift provides. First, only two alternatives are necessary for round-bit addition, so the circuitry represented by multiplexor 166 can be significantly simpler than it needs to be in conventional arrangements. The logic needed to develop its selection signals is simpler, too.

More important, the circuitry that multiplexors 164 and 188 represent can be less complicated, and thus faster, than corresponding circuitry in conventional arrangements. Specifically, they need to select between only two shift positions, not three. In some implementations, this makes it practical to include the shift selection carry/no-carry selections in the same multiplexor, as FIG. 12 illustrates, rather than in a subsequent stage that adds further delay.

It is apparent from the foregoing description that performing normalization shifts of both operands' mantissas before operand subtraction can significantly reduce processing delay if the normalization-shift amount is predicted without performing a full-mantissa-width carry-propagation addition. This invention therefore constitutes a significant advance in the art.

What is claimed is:

1. In a floating-point processor, an addition pipeline, adapted for application thereto of first and second operand signals, each of which represents the sign, exponent, and mantissa of a respective floating-point input operand, for performing an effective addition or subtraction on the input operands and generating an output signal representing the result, the addition pipeline comprising:

A) a main mantissa adder adapted for application thereto of first and second processed mantissa signals and representing respective mantissa values, the main mantissa adder being selectively operable to perform addition and subtraction on the mantissa values and generate a mantissa-adder output, representative thereof, from which the addition pipeline generates the addition-pipeline output;

B) a pair of processing trains for generating from respective ones of the input operands' mantissas and applying to the main mantissa adder respective processed mantissa signals, each processing train, for at least some values of input operands whose exponent difference is zero or one, performing a normalization shift, when the addition pipeline is performing effective subtraction, by a number of bit positions represented by a normalization-shift signal applied thereto; and C) a normalization-shift-determination circuit that determines a required normalization shift by generating a possible-shift-point-vector signal comprising a plurality of bit signals representing respective bits of a possible-shift-point vector, each bit in the possible-shift-point vector corresponding to a different bit position in the input operands' mantissas, the value of each bit signal in the possible-shift-point vector being determined only from at most three, consecutive bits of the each input operand's mantissa, and applying to the processing trains a normalization-shift signal representing the position of the most-significant one bit in the possible-shift-point vector.

2. An addition pipeline as defined in claim 1 wherein the normalization-shift-determination circuit further comprises a ones stripper that receives the possible-shift-point-vector signal and generates as the normalization-shift signal a signal comprising a plurality of bit signals representing respective bits of a vector derived from the possible-shift-point vector by replacing with zeroes all one bits except the single most-significant one bit thereof.

3. An addition pipeline as defined in claim 2 wherein the normalization-shift-determination circuit further comprises:

A) first, second, and third normalization-shift-point detectors that respectively generate first, second, and third normalization-shift-point-vector signals by comparing the input operands' mantissas; and B) a multiplexor that receives the first, second, and third normalization-shift-point-vector signals, selects one of them, and forwards the selected one as the possible-shift-point-vector signal.

4. An addition pipeline as defined in claim 3 wherein the multiplexor selects the first normalization-shift-point-vector signal if the first operand's exponent exceeds the second operand's exponent by one, selects the second normalization-shift-point-vector signal if the second operand's exponent exceeds the first operand's exponent by one, and selects the third normalization-shift-point-vector signal if the first and second operands' exponents are equal.

5. An addition pipeline as defined in claim 4 wherein:

A) the first normalization-shift-point detector comprises, for each bit of the possible-shift-point vector, a respective first single-bit detector circuit corresponding thereto and thereby to a respective bit position in the input operands' mantissas and generating a respective first-single-bit-detector signal representing a single bit of a first normalization-shift-point vector represented by a first normalization-shift-point-vector signal comprising the first-single-bit-detector signals, the value of the single bit represented by a given first-single-bit-detector signal being a one only if the corresponding bit of the first input operand's mantissa differs from the bit to the left of the corresponding bit of the second input operand's mantissa and
  i) the bit to the right of the corresponding bit in the first input operand's mantissa is a one; or
  ii) the corresponding bit of the second input operand's mantissa is a zero;

B) the second normalization-shift-point detector comprises, for each bit of the possible-shift-point vector, a respective second single-bit detector circuit corresponding thereto and thereby to a respective bit position in the input operands' mantissas and generating a respective second-single-bit-detector signal representing a single bit of a second normalization-shift-point vector represented by a second normalization-shift-point-vector signal comprising the second-single-bit-detector signals, the value of the single bit represented by a given second-single-bit-detector signal being a one only only if the corresponding bit of the second input operand's mantissa differs from the bit to the left of the corresponding bit of the first input operand's mantissa and
  i) the bit to the right of the corresponding bit in the second input operand's mantissa is a one; or
  ii) the corresponding bit of the first input operand's mantissa is a zero; and C) the third normalization-shift-point detector comprises, for each bit of the possible-shift-point vector, a respective third single-bit detector circuit corresponding thereto and thereby to a respective bit position in the input operands' mantissas and generating a respective third-single-bit-detector signal representing a single bit of a third normalization-shift-point vector represented by a third normalization-shift-point-vector signal comprising the third-single-bit-detector signals, the value of the single bit represented by a given third-single-bit-detector signal being a one only if a first or second constituent-single-bit-detector value associated therewith is a one, wherein:
  i) the first constituent-single-bit-detector value associated with a given third-single-bit-detector signal is a one only if the bit to the right of the corresponding bit in the first input operand's mantissa is a one or the bit to the right of the corresponding bit of the second input operand's mantissa is a zero and:
    a) the bit to the left of the corresponding bit of the first input operand's mantissa differs from the bit to the left of the corresponding bit of the second input operand's mantissa, the corresponding bit in the first input operand's mantissa is a zero, and the corresponding bit in the second input operand's mantissa is a one; or b) the bit to the left of the corresponding bit of the first input operand's mantissa is the same as the bit to the left of the corresponding bit of the second input operand's mantissa, the corresponding bit in the first input operand's mantissa is a one, and the corresponding bit in the second input operand's mantissa is a zero; and ii) the second constituent-single-bit-detector value associated with a given third-single-bit-detector signal is a one only if the bit to the right of the corresponding bit in the first input operand's mantissa is a zero or the bit to the right of the corresponding bit of the second input operand's mantissa is a one and:

a) the bit to the left of the corresponding bit of the first input operand's mantissa differs from the bit to the left of the corresponding bit of the second input operand's mantissa, the corresponding bit in the first input operand's mantissa is a one, and the corresponding bit in the second input operand's mantissa is a zero; or b) the bit to the left of the corresponding bit of the first input operand's mantissa is the same as the bit to the left of the corresponding bit of the second input operand's mantissa, the corresponding bit in the first input operand's mantissa is a zero, and the corresponding bit in the second input operand's mantissa is a one.

6. An addition pipeline as defined in claim 5 wherein:

A) the addition pipeline further includes inversion-signal circuitry that, when the first and second operands' exponents are equal, applies to the processing trains an inversion signal that has a first, inversion value when one of the constituent-single-bit-detector values corresponding to the one bit in the normalization-shift signal is a first value and that has a second, non-inversion value when that constituent-single-bit-detector value is a second value; and B) when the main mantissa adder performs a subtraction, it subtracts the mantissa value represented by the first processed mantissa signal from that represented by the second processed mantissa signal when the inversion signal has its inversion value, and it subtracts the mantissa value represented by the second processed mantissa signal from that represented by the first processed mantissa signal when the inversion signal has its non-inversion value.

7. An addition pipeline as defined in claim 6 wherein:

A) each third single-bit detector circuit generates its third-single-bit-detector signal by generating first and second constituent-single-bit-detector signals respectively representative of the first and second constituent-single-bit-detector values associated therewith and performing an OR operation thereon; and B) the inversion-signal circuitry receives the first constituent-single-bit-detector signals and the values of the inversion signal that the inversion-signal circuitry applies to the main mantissa adder when the first and second operands' exponents are equal and the values of the first constituent-single-bit-detector signal corresponding to the one bit in the normalization-shift signal are zero and one are respectively the inversion and non-inversion values.

8. An addition pipeline as defined in claim 1 wherein:

A) the addition pipeline further includes inversion-signal circuitry that applies to the processing trains an inversion signal that has a first, inversion value when the input operands' exponents are equal only if the bit in the first input operand's mantissa to the right of the bit therein corresponding to the one bit in the normalization-shift signal is a one or the bit to the right of the corresponding bit of the second input operand's mantissa is a zero and:

i) the bit to the left of the corresponding bit of the first input operand's mantissa differs from the bit to the left of the corresponding bit of the second input operand's mantissa, the corresponding bit in the first input operand's mantissa is a zero, and the corresponding bit in the second input operand's mantissa is a one; or ii) the bit to the left of the corresponding bit of the first input operand's mantissa is the same as the bit to the left of the corresponding bit of the second input operand's mantissa, the corresponding bit in the first input operand's mantissa is a one, and the corresponding bit in the second input operand's mantissa is a zero; and B) when the main mantissa adder performs a subtraction, it subtracts the mantissa value represented by the first processed mantissa signal from that represented by the second processed mantissa signal when the inversion signal has its inversion value, and it subtracts the mantissa value represented by the second processed mantissa signal from that represented by the first processed mantissa signal when the inversion signal has its non-inversion value.

* * * * *